United States Patent
Pinyayev et al.

(10) Patent No.: US 6,740,281 B2
(45) Date of Patent: May 25, 2004

(54) THREE-DIMENSIONAL ARTICLES OF INDETERMINATE AXIAL LENGTH

(75) Inventors: Aleksey Mikhailovich Pinyayev, West Chester, OH (US); Shaffiq Amin Jaffer, Loveland, OH (US); Theodore Jay Verbrugge, Reily, OH (US)

(73) Assignee: The Procter & Gamble Company, Cincinnati, OH (US)

(*) Notice: Subject to any disclaimer, the term of this patent is extended or adjusted under 35 U.S.C. 154(b) by 172 days.

(21) Appl. No.: 10/090,600

(22) Filed: Mar. 4, 2002

(65) Prior Publication Data

US 2003/0165080 A1 Sep. 4, 2003

(51) Int. Cl.⁷ ............................................... B29C 33/44
(52) U.S. Cl. ........................ 264/334; 249/64; 249/145; 249/176; 425/450.1; 425/468
(58) Field of Search ............................. 425/450.1, 468; 249/63, 64, 145, 175, 176; 264/299, 334

(56) References Cited

U.S. PATENT DOCUMENTS

| | | | | |
|---|---|---|---|---|
| 1,217,860 A | * | 2/1917 | Dunn | 249/145 |
| 2,012,800 A | * | 8/1935 | Allen | 249/145 |
| 2,133,019 A | | 10/1938 | Campbell | |
| 2,254,295 A | * | 9/1941 | Kohl et al. | 249/145 |
| 2,369,067 A | | 2/1945 | Mayer | |
| 2,487,359 A | * | 11/1949 | Natzler | 249/145 |
| 2,615,202 A | | 10/1952 | Talalay | |
| 2,923,975 A | | 2/1960 | Voumard et al. | |
| 3,904,165 A | | 9/1975 | Den Boer | |
| 4,062,524 A | | 12/1977 | Brauner et al. | |
| 4,218,038 A | | 8/1980 | Garneau, Sr. | |
| 4,220,416 A | | 9/1980 | Brauner et al. | |
| 4,471,936 A | | 9/1984 | Bondpers | |
| 5,114,657 A | * | 5/1992 | Miyajima | 249/176 |
| 5,167,898 A | * | 12/1992 | Luther | 249/64 |
| 5,378,063 A | | 1/1995 | Tsukada | |
| 5,435,061 A | | 7/1995 | Lantz | |
| 5,522,661 A | | 6/1996 | Tsukada | |
| 5,891,487 A | | 4/1999 | Parise | |
| 6,171,533 B1 | | 1/2001 | Adams et al. | |

* cited by examiner

Primary Examiner—James P. Mackey
(74) Attorney, Agent, or Firm—Larry L. Huston; Leonard W. Lewis; Steven W. Miller

(57) ABSTRACT

An integral three-dimensional article having interstitials therethrough, the three-dimensional article comprises an unconstrained number of axially successive stages. An apparatus and process for molding such a three-dimensional article are also disclosed. The apparatus has members extending into a mold cavity, each member having access to the periphery of the mold cavity. Each stage may nest within an adjacent stage. The nesting may be accomplished by having the end of one stage be convex, while the mating end of an adjacent stage is complementary and concave. The article may be useful as a static mixer, heat exchanger, etc.

8 Claims, 9 Drawing Sheets

THREE-DIMENSIONAL ARTICLES OF INDETERMINATE AXIAL LENGTH

FIELD OF INVENTION

The invention relates to three-dimensional moldable articles having interstitials therein, and more particularly to such articles having an unconstrained axial length.

BACKGROUND OF THE INVENTION

A wide variety of motionless or static mixer designs are known in the art. Static mixers mix one or more fluids, (gases, liquids, powders, etc.) in a flow stream without the need for external energy input such as occurs with rotating impellers, agitation, etc. One of the most effective static mixers comprises a multi-stage labyrinth of elongate mixing elements forming a lattice structure of intersecting webs and slots. Such a static mixer forms a conduit having intersecting channels which transversely split, axially rotate and recombine one or more component fluid streams into smaller and smaller streams. As the component streams become smaller, the outlet product from the static mixer becomes more homogenous.

A static mixer may have multiple stages. A stage combines component streams flowing in a first direction transverse to the axis of the static mixer, then divides the flow in a second direction occurring transverse to the axial flow direction. U.S. Pat. No. 4,062,524, iss. Dec. 13, 1977 to Brauner et al., and U.S. Pat. No. 4,220,416, iss. Sep. 2, 1980 to Brauner et al., disclose exemplary static mixers.

While the lattice type of static mixer has been generally preferred in the industry, it is difficult to construct. Typically, an assembly of individual bars forming a single stage is sand cast. This process is expensive, as each stage is individually cast and a new mold is required to cast each stage. Additional expense occurs when the stages must be joined, in sequence, in the axial direction as disclosed in U.S. Pat. No. 5,435,061, iss. Jul. 25, 1995 to Lantz. Thus, producing a preferred type of static mixer is a time consuming and expensive process.

Alternatively, static mixers have been made from stamped steel plates. The plates have wing portions extending from bending lines and are alternately bent in staggered relationship. The parts thus formed are then assembled into three-dimensional grids having central strip portions and wing portions which provide fluid passages. Static mixers made according to such processes are illustrated in U.S. Pat. Nos. 5,378,063, iss. Jan. 3, 1995 to Tsukada and 5,522,661, iss. Jun. 4, 1996 to Tsukada.

Attempts have been made in the art to injection mold static mixers. However, the injection molded static mixers suffered from simpler designs which do not combine multiple fluid streams as effectively as a lattice type static mixer. One such static mixer is disclosed as an extrusion in U.S. Pat. No. 5,891,487, iss. Apr. 6, 1999 to Parise.

The art relating to injection molding does not disclose a way to make three-dimensional articles comprised of elongate elements, such as static mixer blades, and having interstitials therethrough. For example, U.S. Pat. No. 4,218,038, iss. Aug. 19, 1980 to Garneau, Sr. discloses a mold for making hair combs. However, such a comb is generally planar. Garneau, Sr. does not suggest a way to mold non-planar articles.

Accordingly, there is a need in the art for a way to injection mold three-dimensional articles comprised of elongate elements and having interstitials therethrough. Further, there is a need in the art for a way to inexpensively produce static mixers, heat exchangers, and other articles having elongate elements and interstitials. Further, there is a need in the art to produce static mixers, and other three-dimensional articles, having repeating patterns but which are not constrained in their length.

SUMMARY OF THE INVENTION

The invention comprises an integral three-dimensional article having interstitials. The article comprises an axial direction having lateral dimensions perpendicular to the axial direction and which which define the periphery of the article. The article comprises alternatingly disposed elongate members and interstitials. The elongate members are arranged in two planes, with each plane intersecting at an angle. The invention also comprises a process and apparatus for making the article.

All documents cited are, in relevant part, incorporated herein by reference. The citation of any document is not to be construed as an admission that it is prior art with respect to the present invention.

BRIEF DESCRIPTION OF THE DRAWINGS

The drawings are described in terms of an article useble as a static mixer.

DETAILED DESCRIPTION OF THE INVENTION

The article according to the present invention has many uses, which are not limited to the specific applications described below. However, the article will be described with exemplary, non-limiting uses in mind. It is only necessary that the article be moldable in an integral form. By moldable it is meant that the article is able to be formed from flowable, solidifiable materials. By integral it is meant that the article is molded as a single piece. It is to be recognized that several integral articles according to the present invention may be joined together to form a composite article. However, such joining of integral articles does not change or destroy their integral characteristics, as each integral article remains integral after joining.

The article according to the present invention is of unconstrained axial length. By unconstrained it is meant that the axial length of the article is not limited by reasonable constraints in the manufacturing process related to the number of stages in the article. A stage is the smallest repeating unit cell in the article. For example, the length may be limited by floor space in the plant, or reasonable sizes of molds. However, the length of the article is not limited by having two, three, four, five, etc, or any reasonable number of stages.

Figure 1:
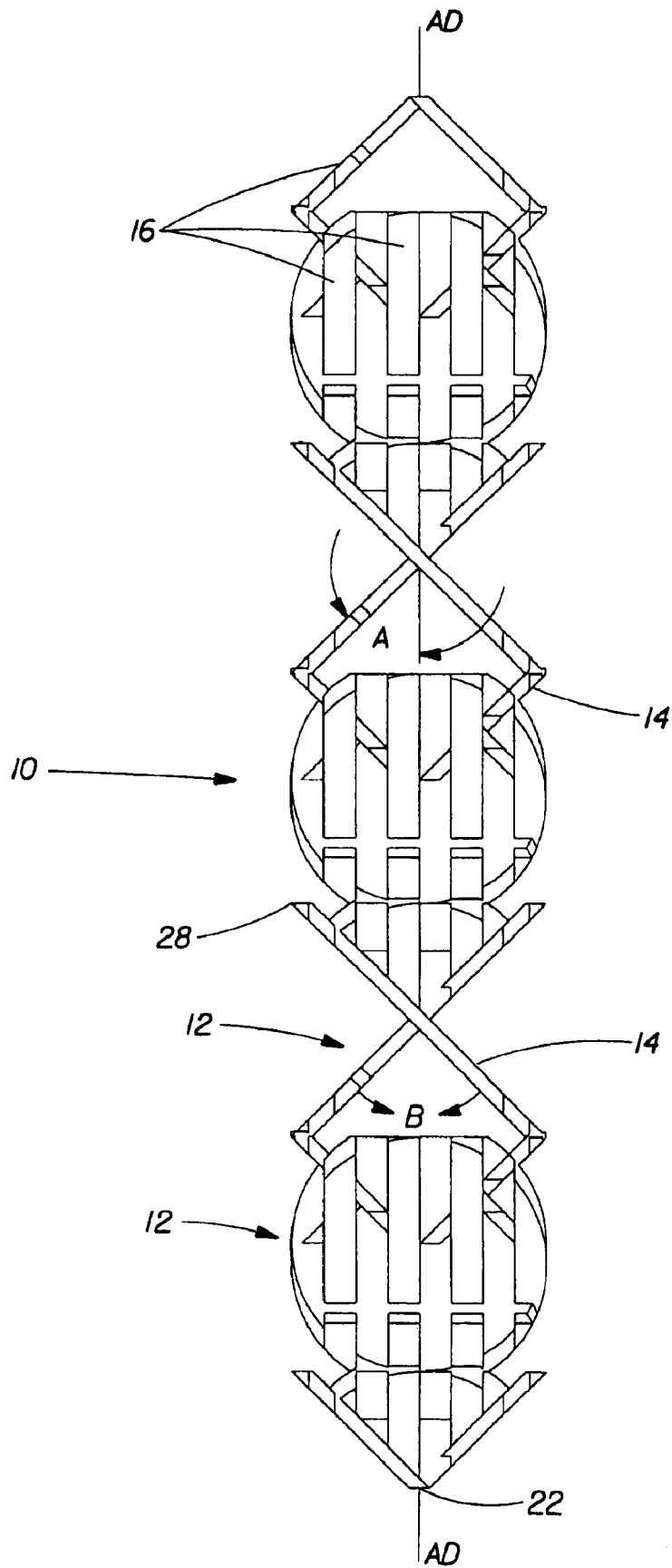
FIG. 1 is a frontal view of an article according to the present invention having nested stages.
Figure 2:
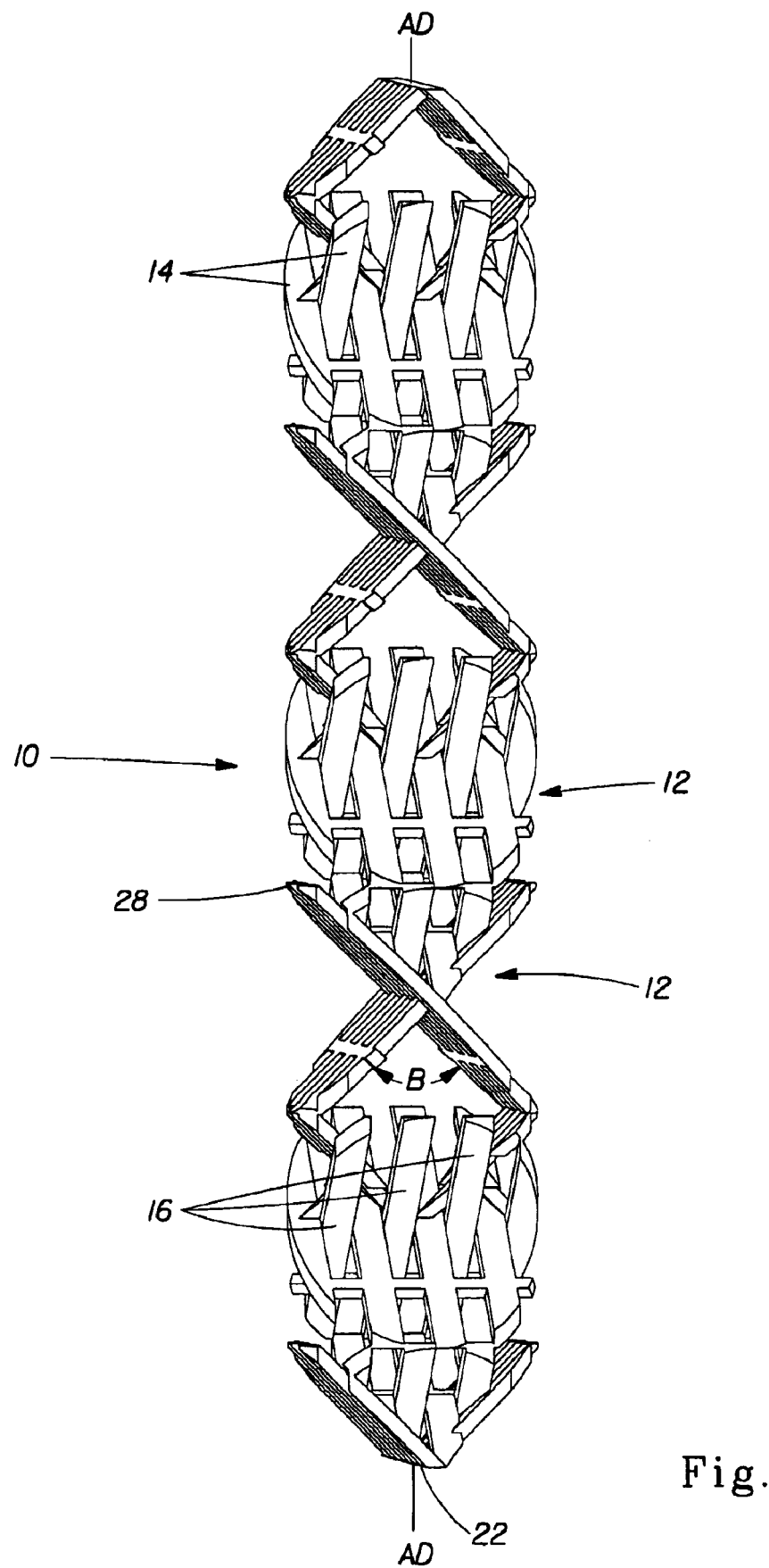
FIG. 2 is a perspective view of the article of FIG. 1.
Figure 3:
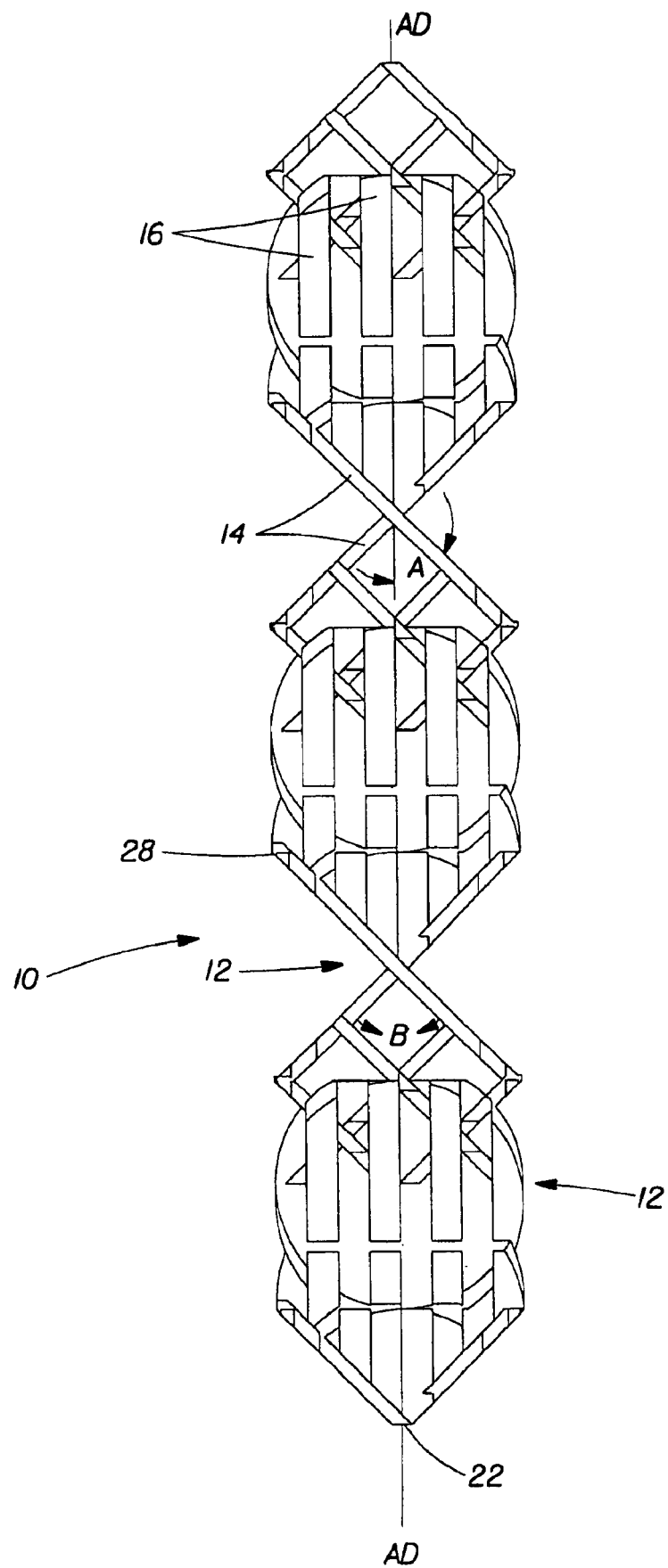
FIGS. 3 is a frontal view of an alternative embodiment of an article according to the present invention and having nested stages and bars of intermediate length which do not span the entire lateral dimension of the article.
Figure 4:
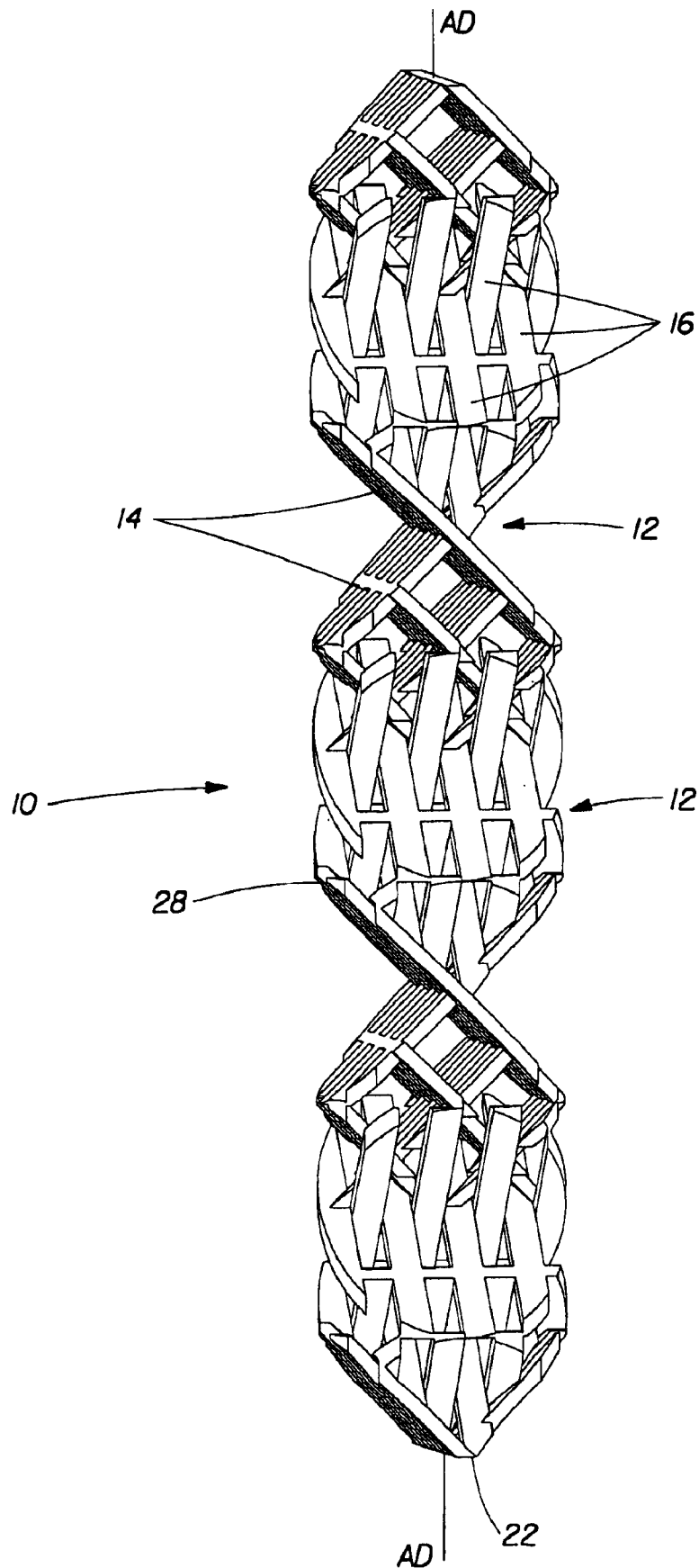
FIG. 4 is a perspective view of the article of FIG. 3.

Referring to FIGS. 1–2 for example, the article according to the present invention may be a static mixer 10. A static mixer 10 according to the present invention will impart shear along its length in the axial direction AD. As used herein, a "static mixer" 10 is an assembly of one or more stages 12 that divides, mixes and recombines materials flowing through a flow channel by subdividing, stretching and recombining the flow. A stage 12 is an assembly of elements 14 inserted in the flow channel. An element 14 is an assembly of bars 16, each bar dividing the flow into at least two streams that are combined with other streams and mixed together. Each element 14 forms a plane, as described below.

The bars 16 within each element 14 are discrete, optionally parallel, and have a fixed and predetermined geometry. Inside the static mixer 10, fluids flow past the stationary bars 16. The bars 16 are separated by interstitials. Thus, any cross-section of the static mixer 10 will comprise alternatingly disposed interstitials and bars 16. Inside the static mixer 10, fluids flow through the interstitials and past the stationary bars 16.

The axial flow direction AD is the primary direction of fluid flow through the static mixer 10. It is to be recognized, however, that very little flow is purely in the axial direction AD and that some fluid flow lateral to the axial direction AD is almost always present. The fluid flow in the lateral direction will change as different stages 12 of the static mixer 10 are encountered, and will be different at different positions within the same stage 12 of a static mixer 10. A plurality of lateral directions extends radially outwardly from the axial direction AD.

"The static mixers 10 illustrated in FIGS. 1–6 are six-stage 12 static mixers 10, although a single-stage 12 static mixer 10 is also within the scope of the present invention. Further, it is to be recognized that single-stage 12 or multi-stage 12 static mixers 10 according to the present invention may be combined in sequence, to produce a static mixer 10 having any desired number of stages 12. While a round static mixer 10 is illustrated, the static mixer 10 according to the present invention may be of any desired cross-section. The static mixer 10 may be designed according to the teachings set forth in commonly assigned U.S. application Ser. No. 09/911,774, filed Jul. 24, 2001, in the names of Catalfamo et al., now U.S. Pat. No. 6,550,960 B2, issued Apr. 22, 2003. The stages 12 of the static mixer 10 may be of the same or different length n the axial direction AD, of equal or unequal diameter/cross-section, and have the same number of bars 16 or a different number of bars 16."

The bars 16 of each stage 12 of the static mixer 10 form an angle A relative to the axial direction AD. Further, it is typical that a particular stage 12 of the static mixer 10 have at least two sets 18 of bars 16, with each set 18 of bars 16 forming an angle A relative to the axial direction AD. The angle A is illustrated to be 45 degrees in the figures, although the invention is not so limited. Further, an included angle B is acutely formed between interlaced sets 18 of bars 16 within a stage 12 of the static mixer 10. The included angle B is shown to be 90 degrees, but the invention is not so limited. The included angle B may range from 1 to 179 degrees and preferably 60 to 120 degrees and more preferably is 90 degrees. If each set 18 of bars 16 in a stage 12 of the static mixer 10 forms an equal angle A relative to the axial direction AD, then the included angle B between interlaced sets 18 of bars 16 will be twice the angle A of one set 18 of bars 16 relative to the axial direction AD.

Further, each stage 12 of the static mixer 10 may optionally be rotatably offset about the axial direction AD relative to an adjacent stage 12 of the static mixer 10. The figure illustrates that adjacent stages 12 of the static mixer 10 to be rotationally offset 90 degrees, however, the invention is not so limited. If a small rotational offset is selected, the resulting static mixer 10 will have solid sections inherent to the molding process.

If a constant rotational offset between adjacent stages 12 is selected, and the static mixer 10 comprises several stages 12, a uniform repeating pattern is formed. Each of the odd stages 12 will have the same rotational orientation relative to the axial direction AD, and each of the even stages 12 will have the same orientation relative to the axial direction AD. One of skill will recognize that such a pattern may be formed at rotational offsets other than 90 degrees as well. Further, it is not necessary that equivalent rotational offsets be used between adjacent or successive stages 12. Any arrangement which divides and recombines the fluid flow may be suitable.

The bars 16 of each stage 12 may be thought of as lying in two planes formed by the elements 14 of that stage 12. The planes intersect at an angle of 90 degrees, as noted above, however, the invention is not so limited. Each plane of bars 16 comprises bar 16 pairs intersecting at the angle A. The stages 12 of the static mixer 10 do not necessarily terminate at a cross-section perpendicular to the axial direction AD.

Referring to FIGS. 1–4, a plurality of bars 16 of one bar 16 plane are nested within a bar 16 pair of the other bar 16 plane. This arrangement produces stages 12 having a V-shaped axial face 22, as illustrated in the Figures. Each bar 16 pair may be thought of as comprising a broken sinuous arrangement. Thus, the bar 16 pairs partially enclose a plurality of rotationally offset bars 16 from an adjacent stage 12. The embodiments of FIGS. 14 provide the benefit of less pressure drop than found in the embodiment of FIGS. 7–9, and greater mixing than the embodiment of FIGS. 5–6. Further, nested stages 12 provide more fluid mixing per unit length of static mixer 10 than non-nested configurations.

Figure 5:
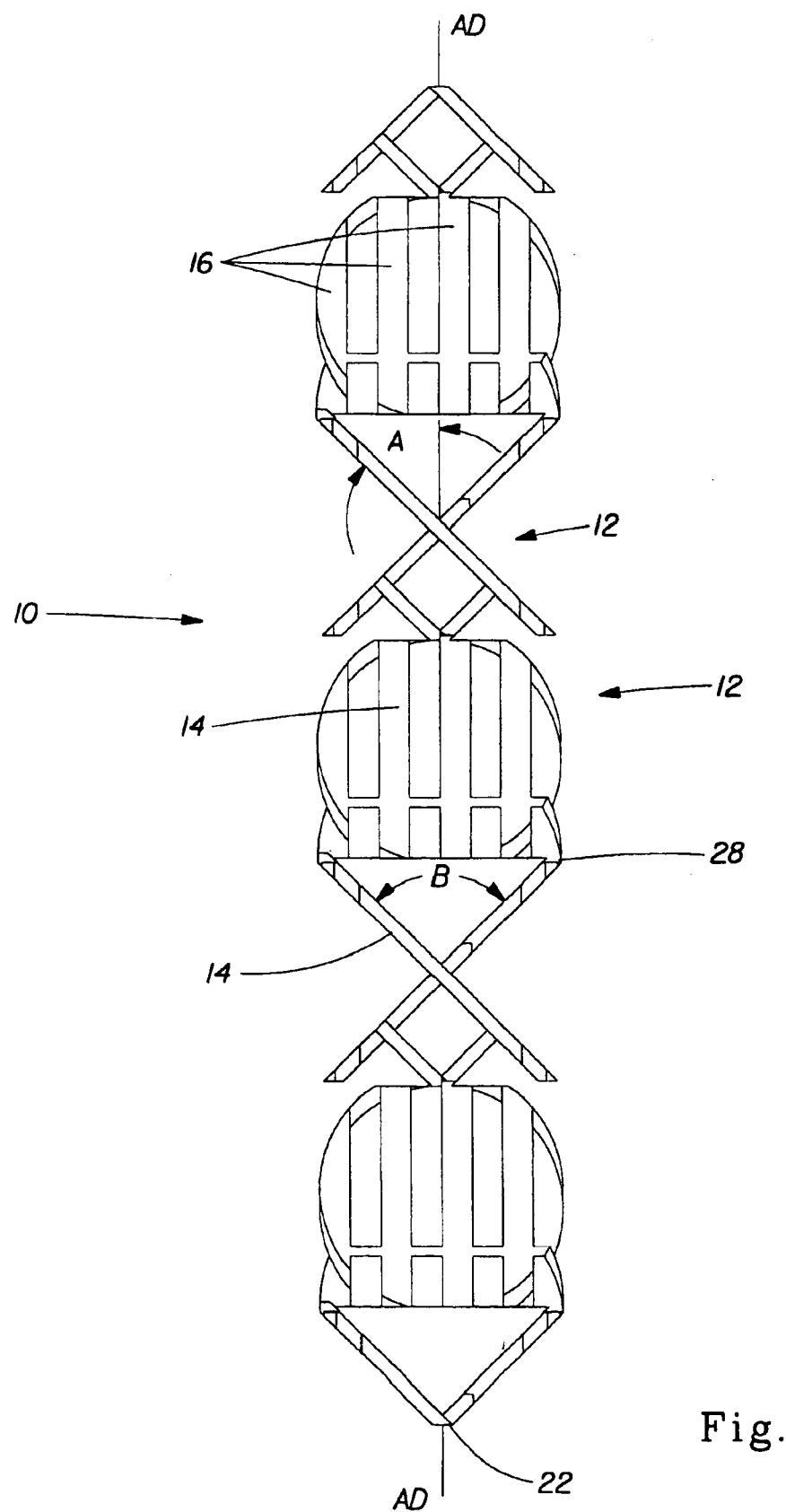
FIG. 5 is a frontal view of an alternative view of an article according to the present invention without nested stages.
Figure 6:
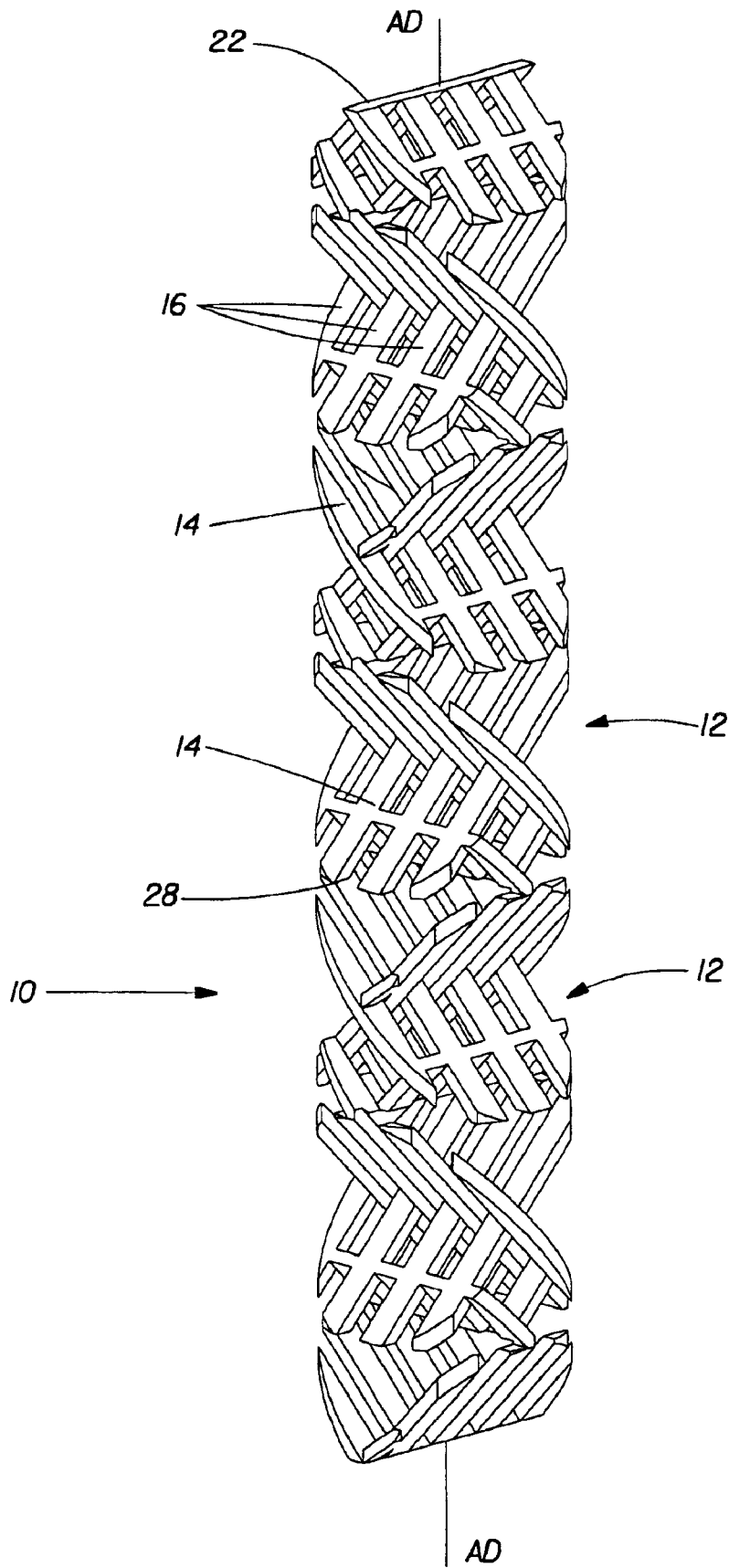
FIG. 6 is a perspective view of the article of FIG. 5.

Referring to FIGS. 5–6, it is not necessary that adjacent stages 12 of the static mixer 10 be nested. Instead, the end of each stage 12 may contact the adjacent stage at only two points, as illustrated. This arrangement provides the benefit of simpler construction and lower pressure drop through the static mixer 10.

As illustrated by the Figures generally, each element 14 of forms a plane which is a geometric variation of the cross section of the static mixer 10. For the round cross sections illustrated, the element 14 forms an ellipse or nearly so. For a square cross section the element 14 would form a rectangle, or nearly so, etc. It is only necessary that the static mixer be insertable in a flow channel of a desired geometry and that the bars 16 in the planes of a common stage be interlaced. By interlaced it is meant that a bar 16 of one element 14 be adjacent to a bar 16 of an element 14 of the other plane in that stage 14.

Perpendicular to the major axis of the bar 16 pairs and lying within the bar 16 plane is a see-through direction. The see-through direction traverses through the entire lateral dimension of the static mixer 10 without interruption or alternatively intercepts a bar 16 of another plane. That is to say that in the see-through direction, a small object may pass from one point on the periphery of the static mixer 10 to a diametrically opposed point on the periphery of the static mixer 10 without intercepting a bar 16 or to another bar 16, and will be parallel to bars 16 located on all four sides of the interstitial having such a see-through direction. The see through direction provides access to that stage 12 of the static mixer 10 for the apparatus described below.

Figure 7:
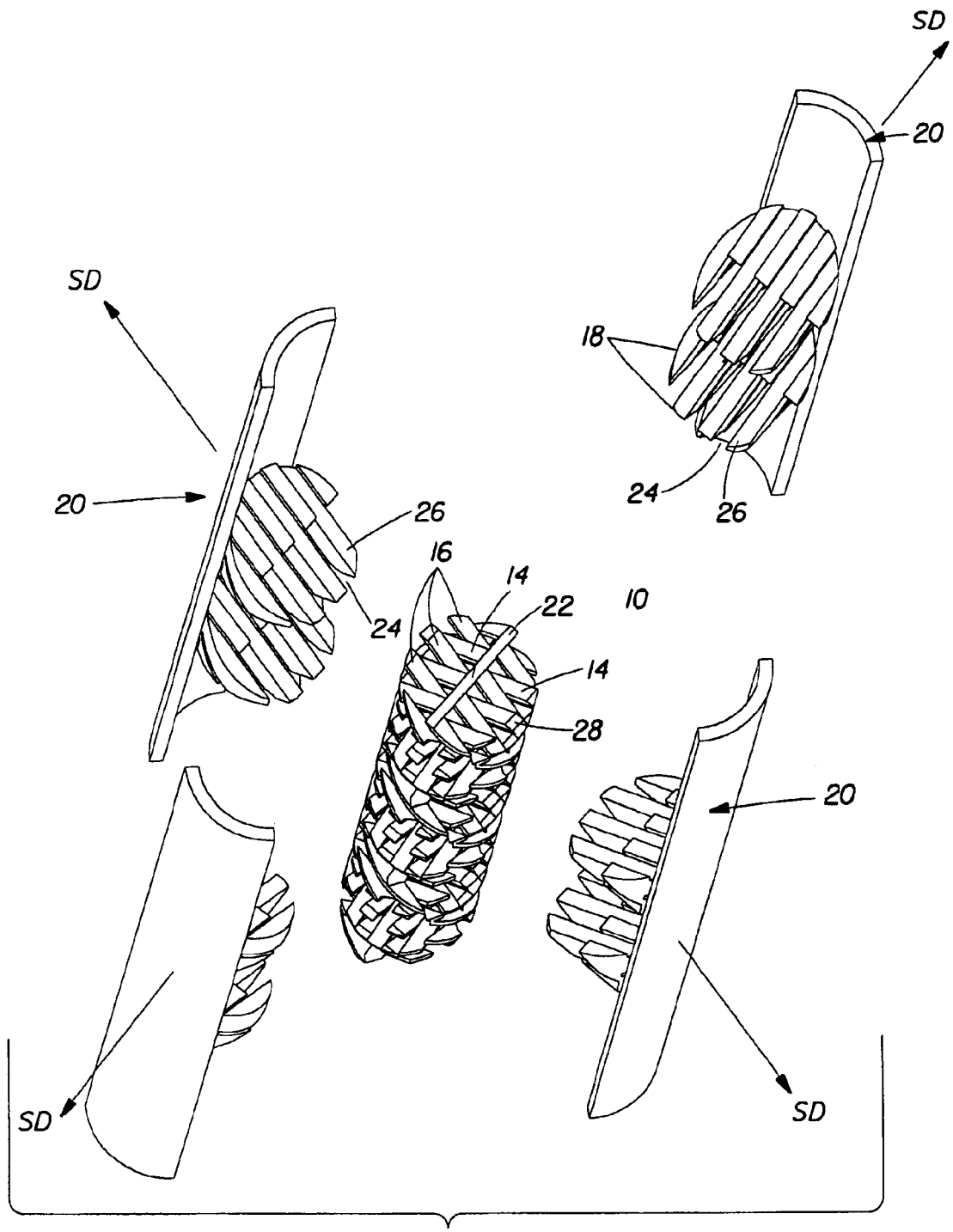
FIGS. 7–8 are perspective views of alternative embodiments of an article according to the present invention having blades with free ends and an apparatus for producing such an article.
Figure 8:
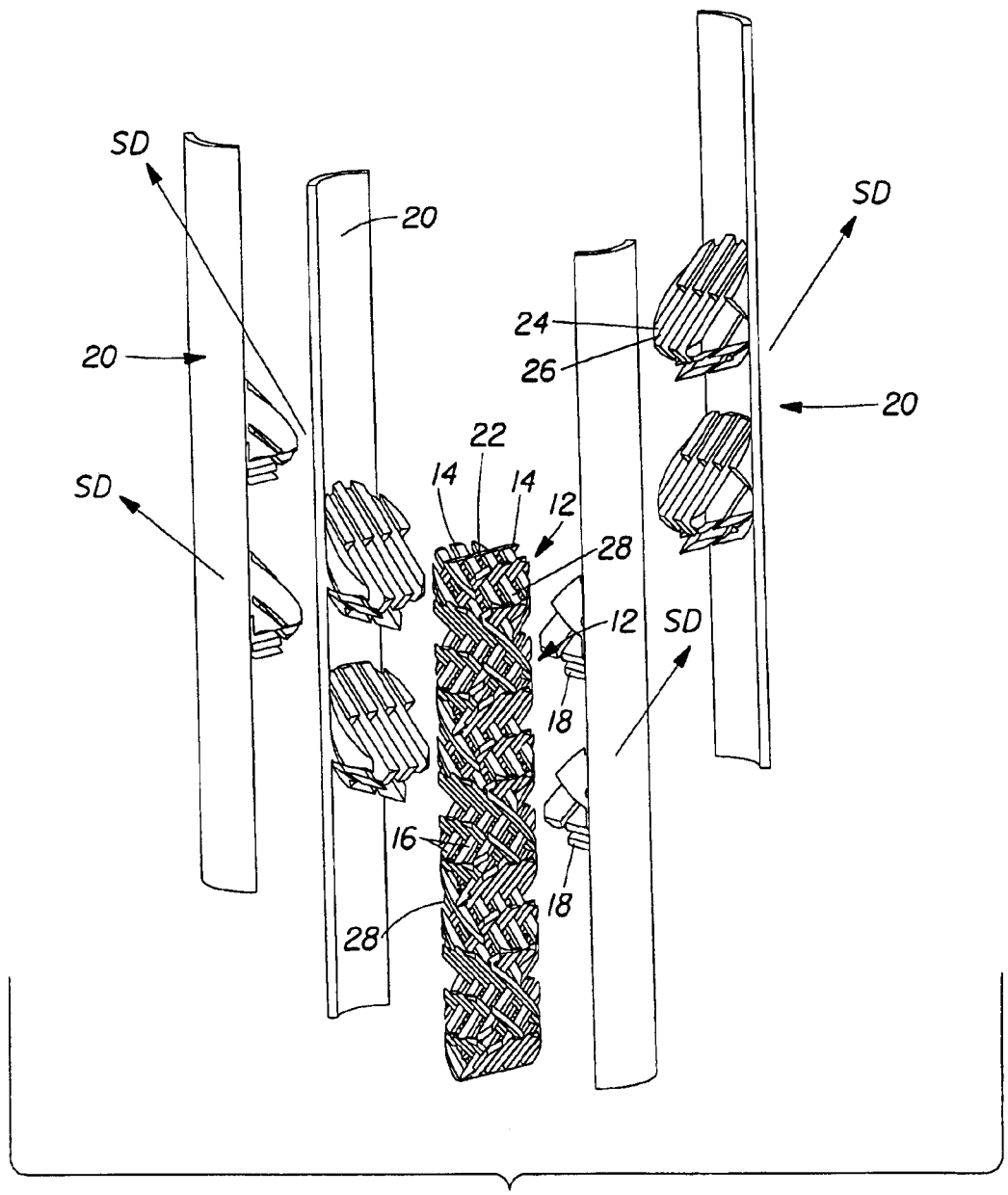
Figure 9:
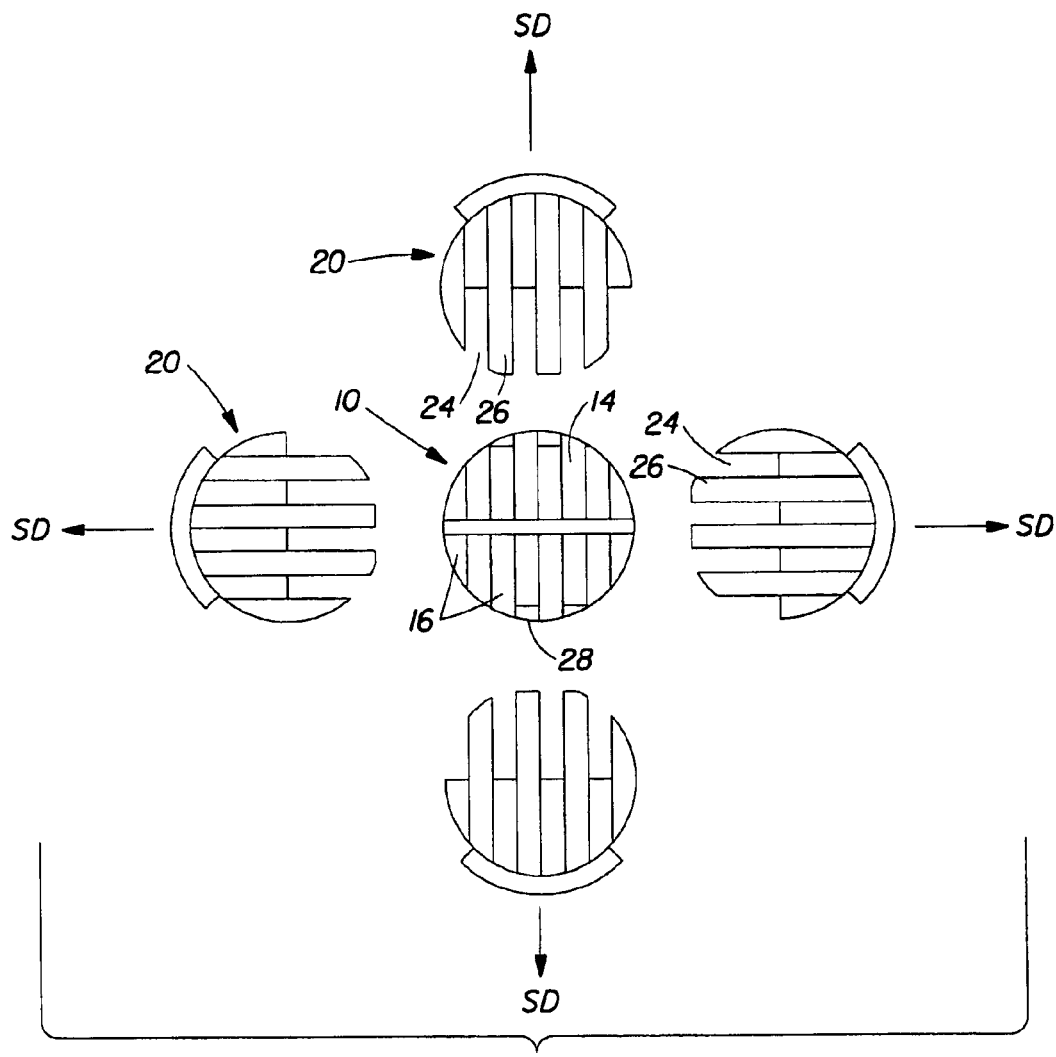
FIG. 9 is a top plan view of the article and apparatus of FIGS. 7–8.

Referring to FIGS. 7–9, four exemplary mold segments 20 are illustrated. However, just two or more mold segments 20 may be circumferentially combined to produce a single stage 12 of the static mixer 10 according to the present invention. If two mold segments 20 are utilized, each mold segment 20 should subtend approximately 180 degrees. If three mold segments 20 are utilized for a particular stage 12, preferably each mold segment 20 subtends 120 degrees. If four mold segments 20 are utilized for a particular stage 12, preferably each mold segment 20 subtends 90 degrees, etc. However, it is to be recognized that mold segments 20 utilized for a particular stage 12 and which subtend unequal arcs may be suitable for the present invention, provided, however, that no mold segment 20 subtends more than 180 degrees.

The mold segments 20 each have alternating blades 26 and slots 24. The blades 26 form the interstitials, or flow channels, in the static mixer 10. Conversely, the slots 24 form the bars 16 of the static mixer 10. The blades 26 and slots 24 are preferably parallel, although the blade 26 may taper from its proximal end to its distal end and become smaller in cross-section as the distal end of the blade 26 is approached. While the figures illustrate blades 26 and slots 24 having a substantially rectangular cross-section, the invention is not so limited. Additionally, either the blades 26 or the slots 24 may have a substantially greater cross-section than the other. Furthermore, different sizes and cross-sections of blades 26 and slots 24 may be utilized within a given mold segment 20 and be disposed in a common stage 12 or in different stages 12. It is only necessary that each mold segment 20 mate with a complementary mold segment.

As illustrated, the mold segments 20 may come together in the radial direction to form and enclose a cavity. Each mold segment 20 comprises a wall. Extending outwardly from the wall of each mold segment 20 are the blades 26 arranged in groupings. The blades 26 on diametrically opposed and axially juxtaposed mold segments 20 will produce a bar 16 pair as noted above. Blades 26 which are offset 90 degrees therefrom will form a bar 16 plane in another stage 12 of the static mixer 10.

As many groupings of blades 26 as desired may be cascaded in the axial direction AD and attached to the walls of the mold segments 20. This flexibility allows a virtually unlimited number of stages 12 of the static mixer 10 to be injection molded at the same time. Furthermore, each stage 12 may be custom tailored to provide a different number, size, etc., of blades 26 and interstitials therebetween. Furthermore, there may be spaces between successive stages 12 wherein there are no blades 26 and flow straightening or the absence of mixing may occur. While a static mixer 10 having four mold segments 20 is illustrated, the invention is not so limited. Of course, the mold segments 20 will have an inlet port when the mold segments 20 are in the closed position. The inlet port may preferably be located on an axial face 22 of the mold segment 20, although, if desired, the port may be disposed on a circumferential surface of the mold segment 20. Additionally, one or more vents may be incorporated into the mold segments 20 as well and as would be known to one of ordinary skill.

When the mold segments 20 are closed a flowable, solidifiable material is injected into the cavity created by the mold segments 20. The material may be a gas, liquid, or may be granular as occurs with powder metallurgy. Solidification may occur due to release of thermal energy, such as freezing, reactive phase changes, such as curing and/or compaction such as occurs with granular or powder materials. Suitable materials for use in making the articles described and claimed herein, particularly static mixers 10, include polymers, such as polyolefins and rubbers, metals such as aluminum and steel, and ceramics such as glass. The resulting solidified material may be rigid or flexible when the static mixer 10 is complete.

The flowable, solidifiable material is injected into the cavity formed by and enclosed by the mold segments 20. The material is allowed to solidify. If desired, energy may be applied to assist in causing this material to solidify. For example, thermal energy may be used to freeze the material from a liquid to a solid. However, other forms of energy input include ultrasonic energy, and actinic radiation including ultaviolet radiation. If desired, the static mixer 10 may be produced by rotomolding or may be molded using other forms of centrifugal energy.

If desired, the mold segments 20 may be sequentially assembled in stages 12. This process may be particular useful if a relatively high viscosity material/high flow resistance cavity is used. For example, the axial direction AD may be vertically oriented and the first stage 12 mold segments 20 assembled to form a cavity. The flowable, solidifiable material is disposed in the cavity. The second stage 12 mold segements 20 may then be assembled to extend the cavity in the axial direction. More flowable, solidifable material is disposed in the cavity to extend the length of the article in the axial direction. This process is repeated until the desired axial length is obtained.

Each mold segment 20 is separated from the solidified material. The separation of each mold segment 20 occurs in a separation direction SD parallel to the bars 16 of that stage 12 of the static mixer 10. It is to be understood that separation of a mold segment from the solidified material includes any relative separation between the two components. For example, the static mixer 10 formed from the solidified material may be held stationery and the mold segment 20 moved away or vice-versa. One of skill will recognize that removal of the last mold segment 20 may require ejection pins or other means well know to one of ordinary skill.

If desired, sequential removal of the mold segments 20 may occur. By sequential removal, it is meant that mold segments are not simultaneously removed from the static mixer 10 upon solidification. Instead, each mold segment 20 is removed in turn, following a spiral pattern down the length of the apparatus.

The separation occurs in a separation direction SD which is outwardly from the axis of the static mixer 10, radially outward from the complementary mold segment 20, and axially away from the mold segments 20 of the adjacent stage 12 (if any). The separation direction SD is diagonal relative to the axial direction AD. If the static mixer 10 resulting from the solidified material has two stages 12, each of the mold segments 20 is separated from the static mixer 10 in a separation direction SD parallel to the blades 26 of that stage 12 of the static mixer 10. Furthermore, each mold segment 20 of the static mixer 10 is separated from the solidified material in a direction which is away from the mold segments 20 of the adjacent and other stage 12.

Thus, an apparatus according to the present invention may be thought of as having at least two complementary mold segments 20 if a single-stage 12 static mixer 10 is being formed and at least four complementary mold segments 20 arranged in two pairs if a two-stage 12 static mixer 10 is being formed, etc. Upon separation, each mold segment 20 is transported away from the cavity formed when the mold segments 20 are closed. Separation may be effected by a transport as is well known in the art. The apparatus may utilize a single transport for one or more mold segments 20. Alternatively, each mold segment 20 may have a dedicated transport.

While the foregoing description has been directed to an article molded by the apparatus and process of the present invention and intended for use as a static mixer 10, the invention is not so limited. The apparatus and process of the present invention may be used to make any three-dimensional article having interstitials therein. By three-dimensional, it is meant that the article may have a significant size in any of three perpendicular dimensions. A three-dimensional article produced according to the present invention will comprise elongate elements 14, such as but not limited to the bars 16 of the static mixer 10. Further, the article made according to the present invention will comprise interstitials. The interstitials are formed by elongate members protruding from the wall of the mold segment 20. The members of a mold segment 20 may protrude from a proximal end juxtaposed with the wall of that mold segment 20 to a distal end remote from the proximal end. If so, such member will produce an article having an interstitial therein, but not therethrough, as illustrated. Both embodiments and combinations thereof are within the scope of the present invention.

To produce an article having an interstitial therethrough, the member must protude through the lateral dimension of the mold cavity. When the mold segments 20 are closed, the distal end of a member may be juxtaposed with a complementary mold segment 20, and more particularly may be juxtaposed with the wall of a complementary mold segment 20. If desired, the distal end of a member may even contact a diametrically opposed mold segment 20. If the distal end of a member contacts a diametrically opposed mold segment 20, the article formed by such an apparatus will have an interstitial therethrough.

Diametrically opposed mold segments 20 include the wall of a mold segment 20 lying on a diameter opposite the first mold segment 20, its wall, or extending member, as well as includes mold segments 20 lying across a chord from the original mold segment 20. However, it is not necessary according to the present invention that the article have an interstitial which extends entirely therethrough. Instead, the article may have an interstitial contained therein, recognizing that the interstitial will intercept the periphery 28 of the article.

Regardless of whether or not the interstials penetrate through the article of the invention, it is necessary that the wall of each mold segment 20 allow access of the member into the mold for the entire desired lateral dimension of the interstitial. The distal end of the member may be juxtaposed with another member or the wall of a diametrically opposed mold segment 20.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for producing an integral multi-stage three-dimensional article having an axial direction and an/unconstrained length in said axial direction and having interstitials therein, said process comprising the steps of
   providing at least two complementary mold segments, said mold segments being juxtaposable to circumscribe an enclosed cavity, said cavity having an axial direction and a lateral direction perpendicular thereto, each said mold segment comprising a wall and having a plurality of members extending from a proximal end juxtaposed with said wall into said cavity, said members defining an angle relative to said axial direction;
   juxtaposing said mold segments to enclose a cavity therebetween, wherein each said member extending into said cavity has a distal end, said distal end being offset from proximal-end in the axial direction said distal end contacting said wall of a diametrically opposed mold segment and/or another member;
   disposing a flowable, solidifiable material in said cavity;
   allowing said material to solidify; and
   separating each said mold segment from said solidified material, said separation occurring in a separation direction parallel to said protruding members of that mold segment.

2. The process according to claim 1, wherein said step of providing mold segments comprises the step of providing mold segments having a plurality of sets of extending members, wherein each set of extending members produces a portion of a stage of said three-dimensional article.

3. The process according to claim 2, comprising the step of providing four complementary mold segments to circumscribe said cavity, each of said complementary mold segments subtending an angle of 90 degrees.

4. The process according to claim 2, comprising the step of sequentially removing said mold segements from said article.

5. An apparatus for molding multi-stage integral three-dimensional articles having interstitials therein, said apparatus comprising;
   at least two complementary mold segments, said mold segments being juxtaposable to enclose a cavity therebetween, said cavity having a longitudinal axis, said mold segments further comprising at least one member extending, into said cavity at an angle relative to said axis;
   and a transport for juxtaposing each said mold segment with the other in closed relationship to form said cavity, wherein said extending members extend in a direction from a proximal end juxtaposed with a wall of its said respective mold segment to a distal end, offset from said proximal end in an axial direction, said distal end contacting either a wall of a diametrically opposed mold segment of another member when said mold segments are in the closed position, said transport further being capable of separating each mold segment away from said cavity inn a separation direction, said separation each mold segment away from said cavity in a separation mold segment.

6. An apparatus according to claim 5, comprising four mold segments, each said mold segment subtending 90 degrees.

7. An apparatus according to claim 6, wherein each said mold segment has a set of extending members, each said set of extending members producing a portion of a stage of said article to be molded.

8. An apparatus according to claim 7, wherein each mold segment comprises at least three sets of extending members.

* * * * *

UNITED STATES PATENT AND TRADEMARK OFFICE
CERTIFICATE OF CORRECTION

PATENT NO. : 6,740,281 B2
DATED : May 25, 2004
INVENTOR(S) : Aleksey Mikhailovich Pinyayev et al.

It is certified that error appears in the above-identified patent and that said Letters Patent is hereby corrected as shown below:

Title page, Item [54] and Column 1, lines 1-2,
Title, insert -- APPARATUS FOR PRODUCING -- before "THREE-DIMENSIONAL ARTICLES OF INDETERMINATE AXIAL LENGTH".

Column 3,
Lines 38-54, delete the quotation marks around the paragraph.
Line 52, delete "n" and insert therefor -- in --.

Column 4,
Line 41, delete "14" after "FIGS." and insert therefor -- 1-4 --.

Column 6,
Line 1, insert -- , -- after the word "closed."

Column 8,
Line 6, delete "an/unconstrained" and insert therfor -- an unconstrained --.
Lines 18-19, delete "said distal end being offset from proximal-end in the axial direction" and insert therefor -- said distal end being offset from said proximal end in the axial direction, --.
Line 41, insert -- a -- between "molding" and "multi-stage".
Line 42, delete "articles" and insert therefor -- article --.
Line 49, delete "," between the word "comprising" and insert therfor -- ; --.
Line 58, delete "of" and insert therefor -- or --.
Lines 62-63, delete "each mold segment away from said cavity in a separation" and insert therefor -- direction being parallel to said members of said respective --.

Signed and Sealed this

Twenty-third Day of November, 2004

JON W. DUDAS
*Director of the United States Patent and Trademark Office*